(12) United States Patent
Konetski

(10) Patent No.: US 7,440,810 B2
(45) Date of Patent: Oct. 21, 2008

(54) MULTI-CHANNEL MEDIA APPLICATIONS SUPPORT WITH CHANNEL-TO-CONNECTOR MAPPING

(75) Inventor: David Konetski, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 10/319,009

(22) Filed: Dec. 13, 2002

(65) Prior Publication Data

US 2004/0117044 A1 Jun. 17, 2004

(51) Int. Cl.
*G06F 17/00* (2006.01)
*H04R 1/00* (2006.01)
(52) U.S. Cl. .................................... 700/94; 381/119
(58) Field of Classification Search ............... 381/119, 381/81; 700/94; 369/4
See application file for complete search history.

(56) References Cited

U.S. PATENT DOCUMENTS

| 6,867,820 B2* | 3/2005 | Jin .............................. 348/738 |
| 2003/0021429 A1* | 1/2003 | Ratcliff et al. ............... 381/119 |
| 2003/0076346 A1* | 4/2003 | Yun ............................. 345/718 |

OTHER PUBLICATIONS

Creative Labs Sound Blaster Live! Platinum 5.1 Sound Card Users Guide (Oct. 2000).*
U.S. Appl. No. 09/447,961, filed Nov. 23, 1999, Achariyakosol et al.
U.S. Appl. No. 09/360,060, filed Jul. 23, 1999, Konetski et al.
* cited by examiner

*Primary Examiner*—Suhan Ni
*Assistant Examiner*—Andrew C Flanders
(74) *Attorney, Agent, or Firm*—Hamilton & Terrile, LLP; Kent B. Chambers

(57) ABSTRACT

An information handling system includes a signal processor such as an audio accelerator based sub-system with the capabilities to define output connectors such that the same set of connectors which provide, for example, home theatre AC3 (Dolby Digital) decoded signals (front, rear, cent/LFE) can provide, for example, 3 discrete stereo channels meant to be routed to different zones in, for example, a living or business space. The information handling system can provide a home theatre experience with one application, taking advantage of audio accelerator capabilities for AC3 signal decode, and provide multi-zone audio distribution, taking advantage of audio accelerator capabilities for decoding multiple streams of compressed digital audio. Home computing architectures that utilize a consumer personal computer (PC) are, thus, now suitable as the audio storage and manipulation center. In one embodiment, the PC provides DSP/decode pre-amplification functions and routes audio output to a generic 6-channel amplifier. In one embodiment, the system also includes a simple to use user interface (UI) to (i) select and initiate processing of multiple streams of audio for playback and (ii) map routing of the audio signals to stereo signal compatible jacks. Each pair of stereo output signals can be associated with a zone. Each zone can be represented in the UI such that the user can direct the desired audio stream to the desired zone. In another embodiment such as a broadcast situation, one stream can be sent to multiple zones, accomplishing distributed coverage with one audio stream.

30 Claims, 5 Drawing Sheets

MULTI-CHANNEL MEDIA APPLICATIONS SUPPORT WITH CHANNEL-TO-CONNECTOR MAPPING

BACKGROUND OF THE INVENTION

1. Field of the Invention

The present invention relates to the field of information handling systems and more particularly relates to supporting channel-to-connector mapping for multi-channel media applications using an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of the increasing value and use of information handling systems, such as personal computers (PCs), involves PC applications for media processing, such as video, graphic, and audio file processing. For example, as PC audio applications grow in popularity, conventional media processing and distribution opportunities have emerged. PC-based audio accelerators mimic conventional consumer audio electronics by providing dedicated input/output (I/O) functions. Two popular uses for multiple output channels are home theatre sound applications and multi-zone music applications. A popular sound configuration for home theatre consists of six channels or 5.1 sound (front right and left stereo, center front, low frequency effects (LFE) plus left and right rear speakers). An encoding algorithm employed on DVD disks for multi-channel audio is Dolby Digital (AC3) technology by Dolby Laboratories, Inc. (Dolby).

Media files are typically stored and organized on a PC in compressed digital formats, such as MP3 or WMA for audio files. Media files include audio, video, and image files and combinations of the foregoing files. With regard to audio files, conventional PCs are capable of decoding multiple streams of compressed digital audio simultaneously. However, transporting uncompressed streams across a standard I/O bus, such as PCI or 3GIO, in real time creates system bottlenecks, which slow down other tasks running on the system or degrade the quality of the audio streams due to missed audio samples. To efficiently support multi-channel audio decode and playback, the audio files should be transported to an audio accelerator in compressed format and decoded locally using an audio digital signal processor (DSP).

Home audio distribution systems exist which use dedicated I/O and require separate audio inputs for multistream audio support. Professional multi-channel PC cards can be configured to take the output of a third party decoder, such as the Dolby Digital decoder, and route the signals to a fixed number of output jacks or take multiple audio input streams and route them to the same outputs. All of these implementations use the PC host processor to decode compressed audio. The PC card becomes simply a stream router. These cards use the lion's share of the PC's interface bus bandwidth and recommend that no other applications are running while multi-channel audio is active.

Thus, conventionally configured information handling systems are unable to conveniently support multi-channel media applications, especially when the number of output connectors are constrained to less than the number of supported channels.

SUMMARY OF THE INVENTION

In one embodiment of the present invention, an information handling system supports multiple media applications that each provide multi-channel signal outputs. For example, in one embodiment an information handling system includes a media card, such as an audio accelerator card, configured as a personal computer subsystem. The media card supports processing of media files from several multi-channel media applications, such as home theater surround sound applications and multi-zone playback applications. The number of output connectors, such as analog audio jacks, is often limited. The information handling system allows a user to configure channel-to-connector routing by, for example, providing an interface that allows the user to select a particular multi-channel media application and assign channels to specific connectors. The connectors may be identified as connectors or otherwise identified by, for example, the physical zone that they are connected to or particular speaker systems.

In another embodiment of the invention, an apparatus for supporting multiple multi-channel media applications includes output channel connectors and a signal processing system, coupled to the output signal connectors. The signal processing system includes one or more media channel inputs to receive one or more media input channels generated by one or more multi-channel media applications, an input to receive channel-mapping selections, and a signal processor to process the media input channels. The signal processing system further includes a connector mapping system to map processed media channels to the output channel connectors pursuant to the channel mapping selections.

In another embodiment of the invention, an information handling system includes a processor and a memory coupled to the processor and including instructions to generate a user interface to receive media channel selections associated with one or more multi-channel media applications from a user. The system further includes output channel connectors and signal processing system, coupled to the output channel connectors and the processor, for supporting a plurality of the multi-channel media applications. The signal processing system includes one or more media channel inputs to receive media input channels from the one or more media applications associated with the media channel selections, a signal processor to process the media input channels to derive one or more media channels, and a connector mapping system to map media channels to the output channel connectors pursuant to the channel mapping selections.

In a further embodiment of the invention, a method for supporting a plurality of multi-channel media applications using a system having input/output channel quantity constraints includes receiving a selection designating at least one of the multi-channel media applications and channel assignments. The method further includes mapping the channel assignments of each of the designated multi-channel media applications to output channel connectors and receiving input signals corresponding to the channel assignments. The method also includes processing the received input signals for distribution to respective output devices coupled to the output channel connectors and distributing the processed input signals to the respective output devices.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Overview

An information handling system supports multiple media applications that each provide multi-channel outputs. For example, in one embodiment, the information handling system includes a media card, such as an audio accelerator card, configured as part of a personal computer. The media card supports processing of audio files from several multi-channel applications, such as home theater surround sound applications and multi-zone playback applications. Media applications supported by the information handling system each provide a number of audio channels, and the total number of audio channels from all media applications often exceeds the number of output jacks supported by the media card. Thus, the media card is user configurable to allow the user to select which media application will provide audio channels and map the channels to output connectors. In one embodiment, the user can map the selected channels to specific jacks, which is particularly useful if the application is a multi-zone application and the jacks are associated with specific zones. The description of the example embodiments below contains more specific details and operational information for various information handling systems.

In one embodiment, an information handling system includes an audio accelerator based sub-system with the capabilities to define the output jack signals such that the same set of jacks which provide, for example, home theatre AC3 (Dolby Digital) decoded signals (front, rear, center/ LFE) can provide, for example, 3 discrete stereo channels to be routed to different zones in, for example, a living or business space. In this way, the information handling system can provide a home theatre experience with one application, taking advantage of audio accelerator capabilities for AC3 signal decode, and provide multi-zone audio distribution, taking advantage of audio accelerator capabilities for decoding multiple streams of compressed digital audio. The above-described solution can fit well with home computing architectures that utilize a consumer PC as the audio storage and manipulation center. In one embodiment, the PC provides DSP/decode pre-amplification functions and routes audio output to a generic 6-channel amplifier. In one embodiment, the above system also includes a simple to use user interface (UI) to (i) select and initiate processing of multiple streams of audio for playback and (ii) map routing of the audio signals to stereo signal compatible jacks. Each pair of stereo output signals can be associated with a zone of, for example, the living or business space. Each zone can be represented in the UI clearly such that the user can easily direct the desired audio stream to the desired zone. In another embodiment such as a broadcast situation, one stream can be sent to multiple zones, accomplishing, for example, a "whole house" or "whole business" coverage with one audio stream.

Example Embodiments

Figure 1:
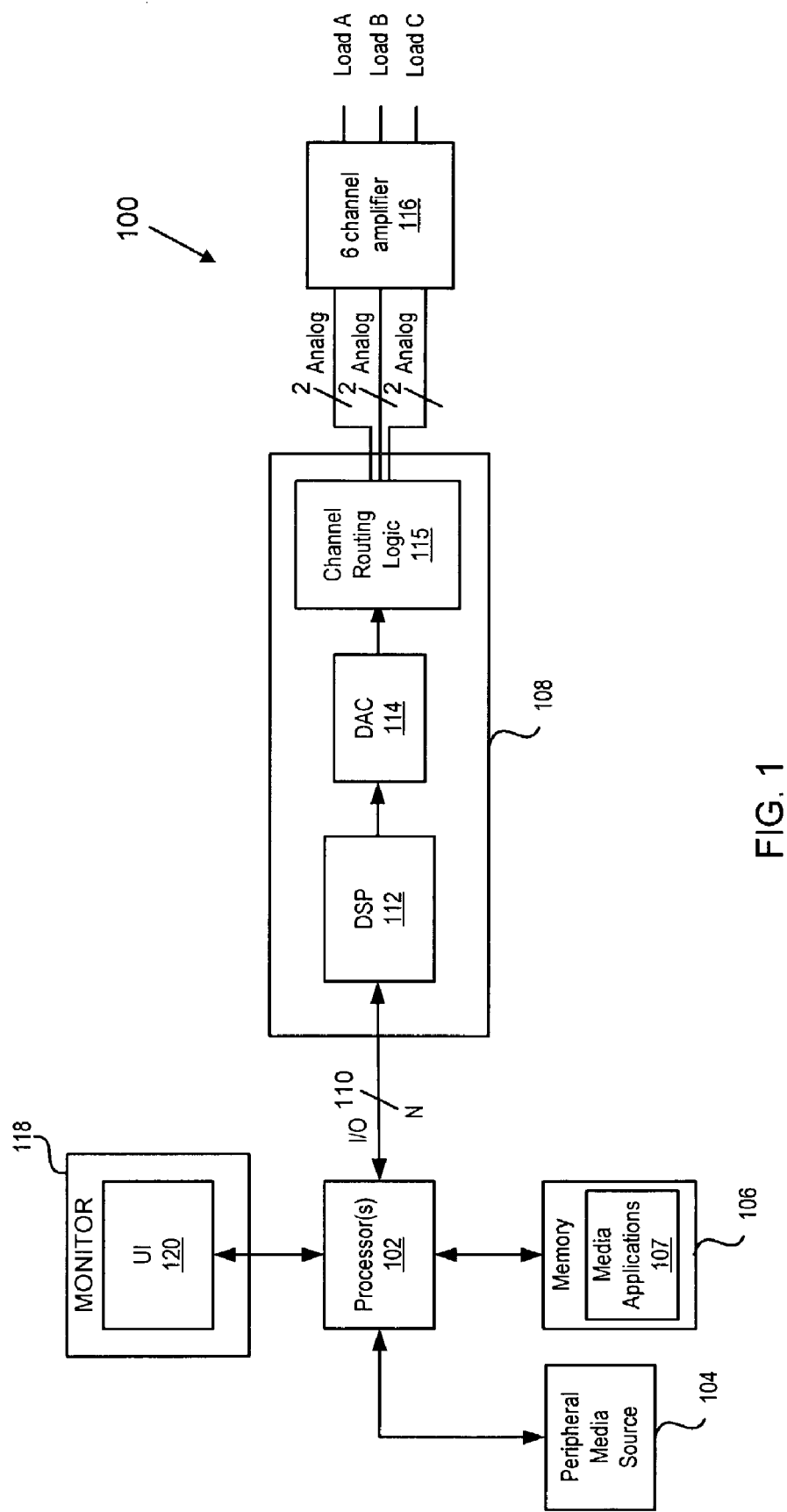
FIG. 1 depicts an information handling system having a signal processing system to process media signals.

FIG. 1 depicts one embodiment of an information handling system 100, which can process and distribute media channels supported by multi-channel media applications. Each channel generally includes one or more signals. For example, a monophonic sound system generally includes a single audio channel containing audio signals that are mixed together. A stereophonic system generally includes two independent audio signal channels that each contain respective signals having a specific level and phase relationship to each other.

The information handling system 100 includes a processor 102 and memory 106. Memory 106 can store media files, such as audio files, for playback by information handling system 100. The audio files can be stored in any of a variety of audio formats such as MP3 (Moving Picture Experts Group, Audio Layer 3), WMA (windows media audio), WAVE (waveform audio file format), and AC3 (Dolby Digital) formats. Multi-channel media applications 107 are also stored in memory 106 and are used by processor 102 to access and process the media files in a well-known manner. Examples of such multichannel media applications are DVD Playback, PC Gaming, Compressed Digital Audio Playback, and Home Music Studio applications.

In one embodiment, processor 102 causes media channels from media files to be routed via I/O bus 110 to signal processor 108 for processing, such as decoding. I/O bus 110 is, for example, a serial or parallel bus. In another embodiment, media sources of peripheral media source 104 are connected to signal processor 108 to directly provide channel input to signal processor 108. Peripheral media source 104 includes audio sources such as CD (compact disk), MP3 (MPEG-1 audio layer 3), DVD (digital versatile disk), VCR (video cassette recorders), media signal routers, musical instruments, and any other device capable of providing media input signals in a format compatible with the processing capabilities of information handling system 100. Signal processor 108 is capable of supporting multiple input channels and generally capable of supporting multiple channel formats. In one embodiment, signal processor 108 is an audio accelerator card. In another embodiment, the audio accelerator is integrated on the PC motherboard. Signal processor 108 and processor 102 could be included on a single PC motherboard.

Signal processor 108 includes a digital signal processor (DSP) 112, which performs well-known signal processing such as signal decoding, decryption, and demodulation. Generally signal processor 108 drives analog loads, and thus includes a well-known digital-to-analog converter (DAC) 114. In one embodiment, the DAC 114 provides analog output signals to channel routing logic 115. Channel routing logic 115 routes the analog signal channels in accordance with channel-to-connector mapping data provided by UI 120 via processor 102 as explained in more detail below. Channel routing logic 115 distributes analog channels to output connectors, such as RCA jacks, S/PDIF jacks, analog audio 1/8" mini-jacks, or other analog audio jacks. In one embodiment, signal processor 108 provides six analog output channels on 3 respective conductor pairs. Generally, the output signals generated by signal processor 108 have insufficient power to drive loads A, B, and C. Thus, an amplifier, such as a well-known 6 channel amplifier 116, is interposed between signal processor 108 and loads A, B, and C to provide sufficient signal driving power. In another embodiment, channel routing logic 115 is implemented as an integral part of DSP 112. The channels are then provided to DAC 114 and distributed to loads A, B, and C as described above.

Information handling system 100 also includes a monitor 118 that can display the user interface (UI) 120. The UI 120 is generated by processor 102 and allows a user to interact with information handling system 100 as described in more detail below. In one embodiment, UI 120 provides an interface that allows a user to select a specific multi-channel media application. Once the multi-channel media application is selected, processor 102 routes signals from the selected application to signal processor 108, and signal processor 108 processes the signals in accordance with the selected application. In some embodiments, specific media channels can be mapped to selected connectors.

Figure 2:
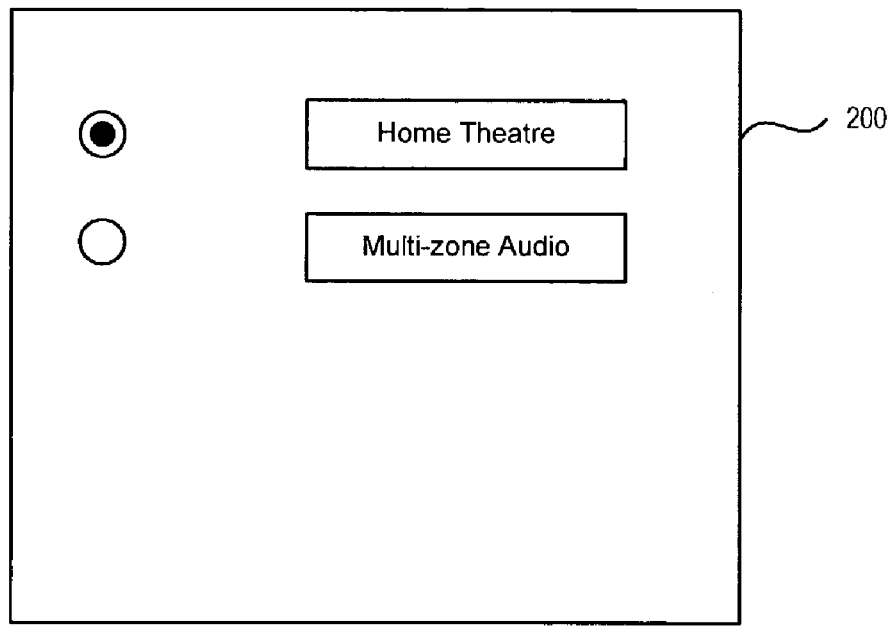
FIG. 2 depicts a first graphical user interface for media application and channel selection for use in conjunction with the information handling system of FIG. 1.

FIG. 2 depicts UI 200, which is one embodiment of UI 120. UI 200 allows a user to select between two multi-channel media applications, Home Theatre and Multi-zone Audio, supported by information handling system 100. In FIG. 2, the darkened radial button indicates that the user has selected Home Theatre. By selecting Home Theatre, processor 102 sends an instruction to signal processor 108 that causes signal processor 108 to recognize incoming channels as home theatre channels and process the channels accordingly.

Figure 3:
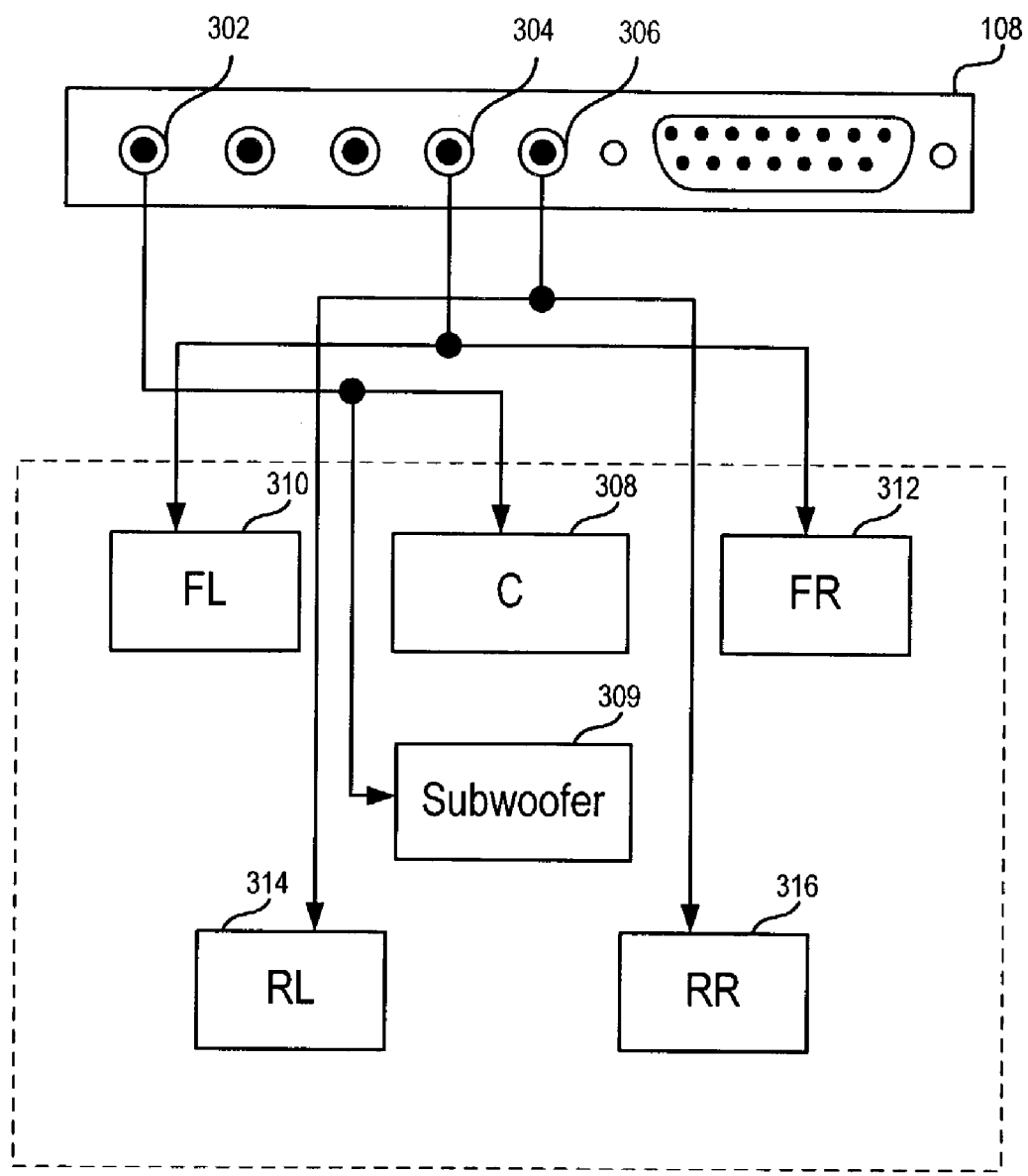
FIG. 3 depicts the configuration of audio jacks consistent with the selections in the graphical user interface of FIG. 2.

FIG. 3 depicts one embodiment of the output channel connectors of signal processor 108. The user selection of FIG. 2 also causes channel routing logic 115 to map home theatre audio channels to specific output channel connectors. In the embodiment of FIG. 3, the default channel-to-connector mapping for Home Theatre is set forth in Table 1. Table 1 also sets forth the connector-to-load channel distributions. Any other connector-to-channel configuration is possible.

TABLE 1

CHANNEL-TO-CONNECTOR MAPPING
- HOME THEATRE MULTI-CHANNEL APPLICATION -

| CHANNEL | CONNECTOR | LOAD |
|---|---|---|
| Center/LFE | Jack 302 | Center Speaker 308 and Subwoofer 309 |
| Left/Right Front | Jack 304 | Front Left Speaker 310 Front Right Speaker 312 |
| Left/Right Rear | Jack 306 | Rear Left Speaker 314 Rear Right Speaker 316 |

Figure 4:
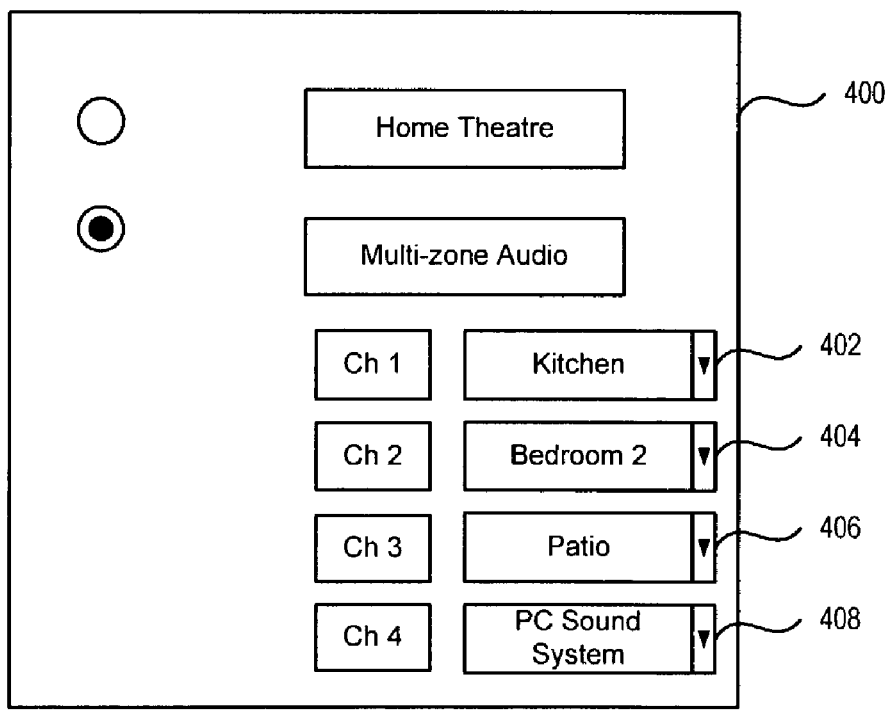
FIG. 4 depicts a second graphical user interface for media application and channel selection for use in conjunction with the information handling system of FIG. 1.

FIG. 4 depicts UI 400, which is another embodiment of UI 120. UI 400 allows a user to select between two multi-channel media applications, Home Theatre and Multi-zone Audio, supported by information handling system 100. In FIG. 4, the darkened radial button indicates that the user has selected Multi-zone Audio. By selecting Multi-zone Audio, the user is also presented with scroll down windows 404, 406, and 408 that allow the user to assign audio channels to specific zones. In the embodiment depicted in FIG. 4, the user assigned channel 1 to the Kitchen zone, channel 2 to the Bedroom 2 zone, and channel 3 to the Patio zone. Other zones may be offered as choices such as a PC sound system, other audio or video processing devices, and other physical locations. Processor 102 sends an instruction to signal processor 108 that causes signal processor 108 to recognize incoming channels as audio channels and process the channels accordingly.

Figure 5:
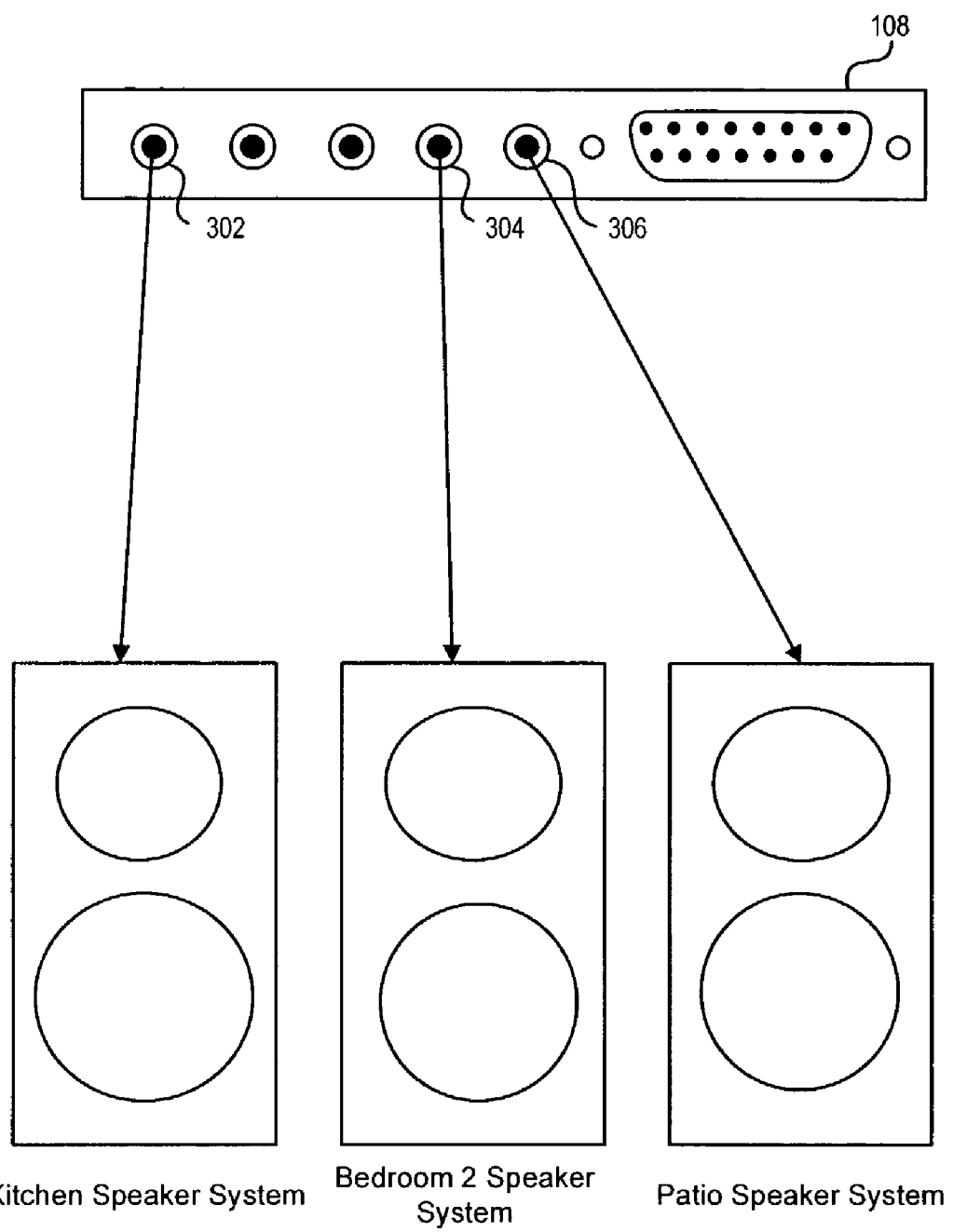
FIG. 5 depicts the configuration of audio jacks consistent with the selections in the graphical user interface of FIG. 4.

FIG. 5 depicts the embodiment of the output channel connectors of signal processor 108. The user selection of FIG. 4 also causes channel routing logic 115 to map multi-zone audio channels to specific output channel connectors. In the embodiment of FIG. 5, the default channel-to-connector mapping is set forth in Table 2. Table 2 also sets forth the connector-to-load channel distributions.

TABLE 2

CHANNEL-TO-CONNECTOR MAPPING
- HOME THEATRE MULTI-CHANNEL APPLICATION -

| CHANNEL | CONNECTOR | LOAD |
|---|---|---|
| 1 | Jack 302 | Kitchen Speaker System |
| 2 | Jack 304 | Bedroom 2 Speaker System |
| 3 | Jack 306 | Patio Speaker System |

Thus, information handling system 100 can be used to select one or more multi-channel media applications and allow a user to select channel-to-connector mappings utilizing a limited number of output jacks.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 6:
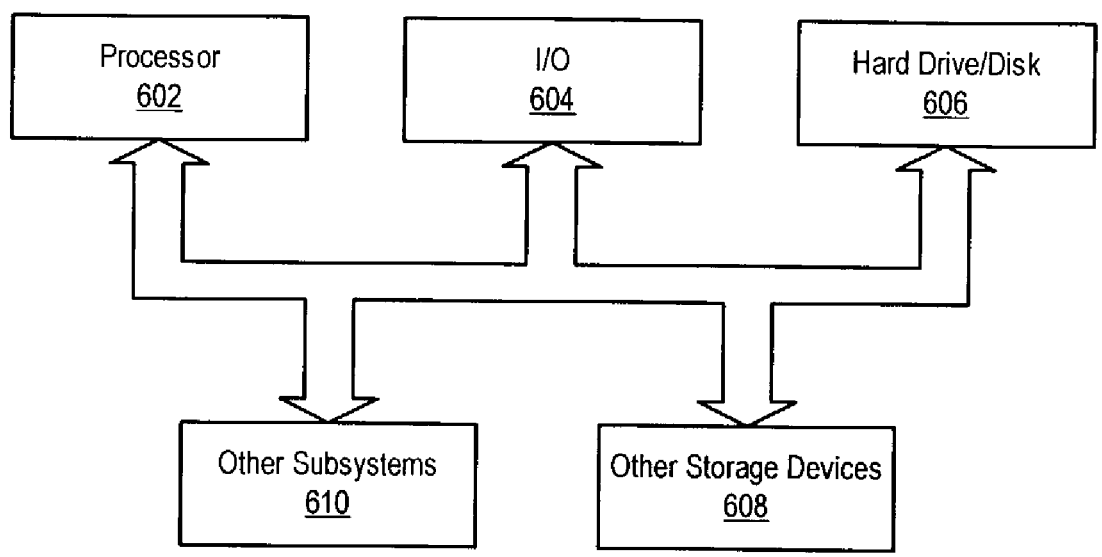
FIG. 6 depicts one embodiment of an information handling system.

Referring briefly to FIG. 6, a system block diagram depicts an information handling system 600. The information handling system 600 includes a processor 602, which is one embodiment of processor 102, input/output (I/O) devices, such as a display, a keyboard, a mouse, and associated controllers, collectively designed by a reference numeral 604, a hard disk and drive 606 (such as memory 106), and other storage devices, such as a floppy disk and drive and other memory devices, collectively designated by a reference numeral 608, and various other subsystems, collectively designated by a reference numeral 610, such as the signal processor 108. One or more buses, shown collectively as a bus 612, interconnect the components of information handling system 600.

Although the present invention has been described in detail, it should be understood that various changes, substitutions and alterations can be made hereto without departing from the spirit and scope of the invention as defined by the appended claims.

What is claimed is:

1. An apparatus for supporting multiple multi-channel media applications, the apparatus comprising:
   a display;
   a processor, coupled to the display;
   a memory coupled to the processor and having code executable by the processor to display a user interface on the display, wherein the user interface displays representations of at least two multi-channel media applications to allow a user to select one of the multi-channel media applications and make channel-to-connector mapping selections, wherein at least one channel can be mapped by the user to any of at least two channel connectors and each channel is mapped to a separate output channel connector;
   output channel connectors; and
   a signal processing system, coupled to the output channel connectors, the signal processing system comprising:
      one or more signal input connectors to receive one or more input signals, wherein each input signal comprises at least one of the media input channels generated by the one or more multi-channel media applications and at least one of the input signals comprises two or more media input channels generated by the one or more multi-channel media applications;
      an input to receive first user selections, wherein each of the first user selections selects one of the multi-channel media applications, and to receive second user selections separate from the first user selections, wherein each of the second user selections selects channel-to-connector mapping for the multi-channel media application selected by one of the first user selections to map the media input channels to output channel connectors;
      a signal processor to process the media input channels; and
      a connector mapping system to map the media channels processed by the signal processor to the output channel connectors pursuant to the second user selections.

2. The apparatus of claim 1 wherein the signal processing system comprises an information handling system audio accelerator card.

3. The apparatus of claim 1 further comprising a personal computer motherboard that includes the signal processing system.

4. The apparatus of claim 1 wherein the signal processing system is configured as part of a personal computer system.

5. The apparatus of claim 1 wherein the media input channels include audio signals.

6. The apparatus of claim 1 wherein the output channel connectors are analog audio jacks.

7. The apparatus of claim 1 wherein the media channels are associated with one or more applications and the applications include home theatre surround sound applications and multi-zone audio applications.

8. The apparatus of claim 1 further comprising:
   an audio source coupled to the signal processing system to provide the one or more media input channels.

9. The apparatus of claim 1 wherein the code executable by the processor to display the user interface on the display further comprises code executable by the processor to include representations of specific zones in the user interface that allow the user to select and assign multi-media channels to one or more of the specific zones.

10. An information handling system comprising:
    a display;
    multiple sets of speakers located within respective zones, wherein each set of speakers includes at least two speakers and each set of speakers is unique;
    a processor coupled to the display;
    memory coupled to the processor and including instructions to generate a user interface to display representations of at least two multi-channel media applications to allow a user to select one of the multi-channel media applications and, separate from selection of the multi-channel media application, allow the user to select the zone to receive audio channels of the selected multi-channel media application;
    output channel connectors coupled to the speakers; and
    a signal processing system, coupled to the output channel connectors and the processor, for supporting a plurality of the multi-channel media applications, the signal processing system comprising:
       one or more signal input connectors to receive one or more input signals, wherein each input signal comprises media input channels from the one or more media applications;
       an input to receive user multi-channel media application selections and to receive, separate from the user multi-channel media application selections, a user selected zone;
       a signal processor to process the input signals to obtain the one or more media input channels; and
       a connector mapping system to map the media channels obtained by the signal processor to the output channel connectors coupled to the speakers located in the user selected zone, wherein at least one channel can be mapped by the user to any of at least two channel connectors and each channel is mapped to a separate output channel connector.

11. The information handling system of claim 10 wherein the signal processing system comprises an audio accelerator.

12. The information handling system of claim 10 wherein the zones comprise physically distinct regions within a physical structure.

13. The information handling system of claim 10 wherein each set of speakers contains a set of speakers completely different from any other of the sets of speakers.

14. The information handling system of claim 10 wherein the output channel connectors are analog audio jacks.

15. The information handling system of claim 10 wherein media channels are associated with one or more applications and the applications include home theatre applications and multi-zone audio applications.

16. The information handling system of claim 10 further comprising:
    an audio source coupled to the signal processing system to provide the one or more media input channels.

17. The information handling system of clam 16 wherein the audio source is selected from the group comprising: a compact disk, a digital versatile disk, a computer sound card, and audio files stored in a memory.

18. The information handling system of claim 10 further comprising:
    a user interface to receive the multi-channel media application and zone selections from the user and to provide the selections to the signal processing system.

19. The information handling system of claim 10 further comprising:

a channel router to route selected media channels to an audio amplifier.

20. A method for supporting a plurality of the multi-channel media applications using a system having input/output channel quantity constraints, the method comprising:
displaying a user interface on a display, wherein the user interface displays representations of at least two multi-channel media applications to allow a user to designate one of the multi-channel media applications and separately select channel-to-output channel connector assignments;
receiving first user selections via the user interface designating at least one of the multi-channel media applications and second user selections, separate from the first user selections, designating channel-to-output channel connector assignments for each of the multi-channel media applications selected by the first user selections, wherein at least one channel can be mapped by the user to any of at least two channel connectors and each channel is mapped to a separate output channel connector;
mapping the channel-to-output connector assignments of each designated multi-channel media application to output channel connectors in accordance with the second user selections designating the channel-to-output connector assignments;
receiving input signals, wherein each input signal comprises at least one of the media input channels and at least one of the input signals comprises two or more of the media input channels;
processing the received input signals for distribution of the one or media input channels to respective output devices coupled to the output channel connectors; and
distributing the one or media input channels to the output channel connectors in accordance with each of the second user selections designating the channel assignments.

21. The method of claim 20 further comprising:
providing a graphical user interface to a user to allow the user to make the selection designating at least one of the multi-channel media applications and channel assignments.

22. The method of claim 20 wherein each channel comprises one or more audio input signals.

23. The method of claim 20 wherein processing the received input signals further comprises:
processing the received input signals using an audio accelerator.

24. The method of claim 20 wherein the multi-channel media applications include home theatre applications and multi-zone audio applications.

25. A system for supporting a plurality of the multi-channel media applications using a system having input/output channel quantity constraints, the system comprising:
a display for displaying a user interface on a display, wherein the user interface displays representations of at least two multi-channel media applications to allow a user to select one of the multi-channel media applications and separately make channel-mapping selections;
means for receiving first user selections via the user interface designating at least one of the multi-channel media applications and second user selections, separate from the first user selections, designating channel-mapping selections, wherein at least one channel can be mapped by the user to any of at least two channel connectors and each channel is mapped to a separate output channel connector;
means for mapping the channel-mapping selections of each of the designated multi-channel media applications to output channel connectors in accordance with the second user selections designating the channel-mapping selections;
means for receiving input signals, wherein each input signal comprises at least one of the media input channels and at least one of the input signals comprises two or more of the media input channels;
means for processing the received input signals for distribution of the one or media input channels to respective output devices coupled to the output channel connectors; and
means for distributing the one or media input channels to the output channel connectors in accordance with each of the second user selections designating the channel-mapping selections.

26. The apparatus of claim 9 wherein the code executable by the processor to display the user interface includes code to display the representations of specific zones as a first physical location, a second physical location, a personal computer sound system, and an audio processing device.

27. The information handling system of claim 10 wherein the instructions to generate the user interface further include instructions to display representations of specific zones in the user interface that allow the user to select and assign multimedia channels to one or more of the specific zones.

28. The information handling system of claim 27 wherein the instructions to generate the user interface further include instructions to display the representations of specific zones as a first physical location, a second physical location, a personal computer sound system, and an audio processing device.

29. The method of claim 20 wherein displaying the user interface further comprises:
displaying representations of specific zones in the user interface that allow the user to select and assign multimedia channels to one or more of the specific zones.

30. The method of claim 29 wherein displaying representations of specific zones in the user interface comprises:
displaying the representations of specific zones as a first physical location, a second physical location, a personal computer sound system, and an audio processing device.

* * * * *